United States Patent Office

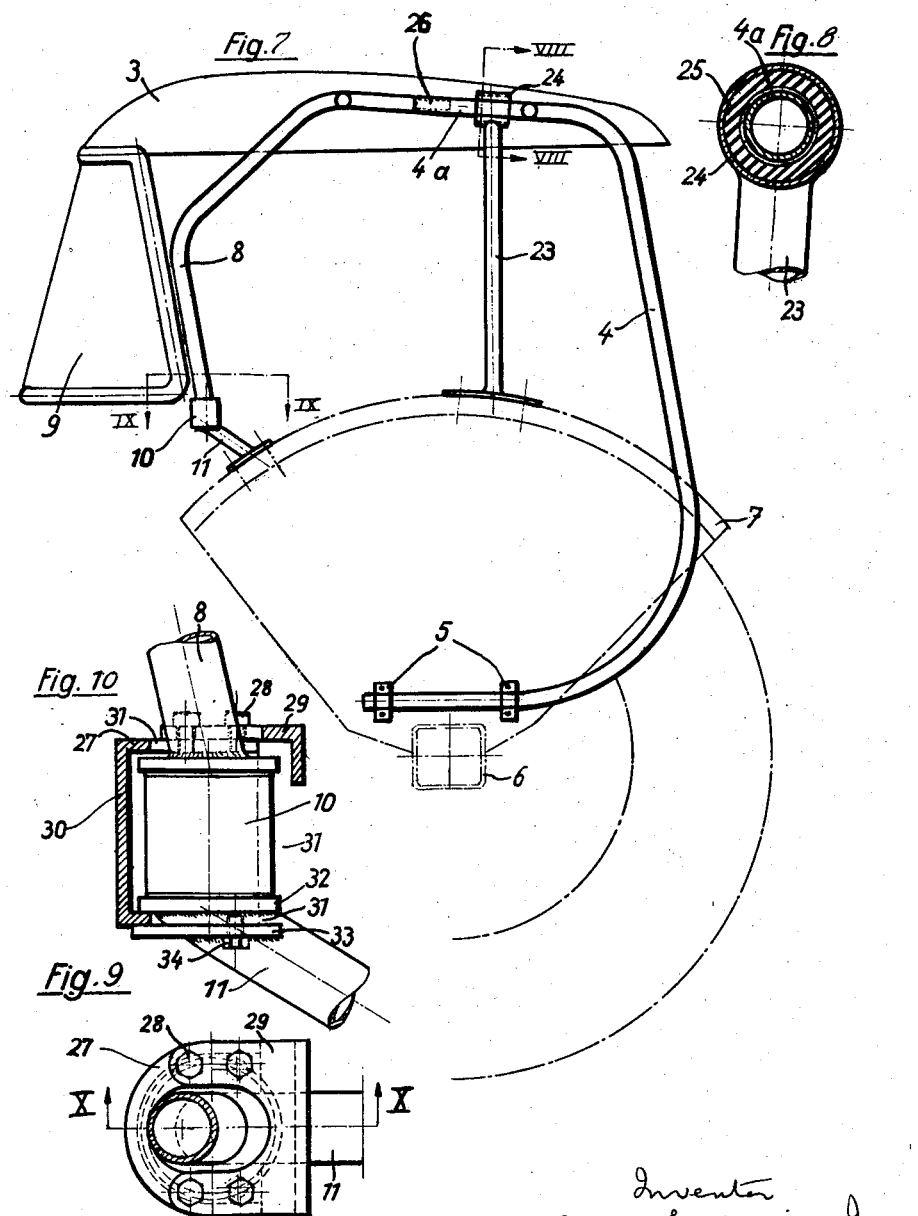

3,101,215
Patented Aug. 20, 1963

3,101,215
RESILIENT SUPPORTS FOR VEHICLE ROOFS
Georg Fritzmeier, Jun., Grosshelfendorf, near Munich, Germany, assignor to Georg Fritzmeier, Grosshelfendorf, near Munich, Germany
Filed Aug. 20, 1959, Ser. No. 835,056
Claims priority, application Germany Aug. 21, 1958
6 Claims. (Cl. 296—102)

The present invention relates to roof arrangements and in particular to roofs of vehicles such as tractors.

In vehicles of this latter type the roofs are conventionally supported by springy linkages which on the one hand are relatively complex and which on the other hand give a resilient support only in a vertical direction but not in any other direction such as a horizontal direction, for example. Moreover, with such conventional structures it is difficult to provide a windshield on the vehicle, and furthermore when excessively large forces occur as in the case where the vehicle overturns so that it rests on its roof, the supports are incapable of withstanding these large stresses.

One of the objects of the present invention is to provide a vehicle of the type referred to above with an exceedingly simple structure which will resiliently support the roof of the vehicle while at the same time opposing forces which tend to move the roof, irrespective of the direction of these forces.

Another object of the present invention is to provide a structure of the above type which can conveniently carry a windshield.

A further object of the present invention is to provide a structure of the type referred to above which is capable of absorbing relatively large forces so that there is no danger of failure of the roof support in an emergency.

With the above objects in view, the invention includes in a vehicle a support means and a roof member spaced over the support means. In accordance with the invention an elongated springy rod means is fixed to the support means extends upwardly therefrom to the roof member and carries the latter, and this springy rod means is capable of yieldably and resiliently opposing forces tending to move the roof member, irrespective of the direction of these forces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 4–6 respectively illustrate various details of the structure of the invention;

FIG. 7 is a side elevation of another embodiment of a structure according to the present invention;

FIG. 8 is a fragmentary sectional elevation taken along line VIII–VIII of FIG. 7 in the direction of the arrows;

FIG. 9 is a sectional plan view taken along line IX–IX of FIG. 7 in the direction of the arrows; and FIG. 10 is a sectional elevation of a stop structure of the invention, FIG. 10 being taken along line X–X of FIG. 9 in the direction of the arrows.

Figure 1:
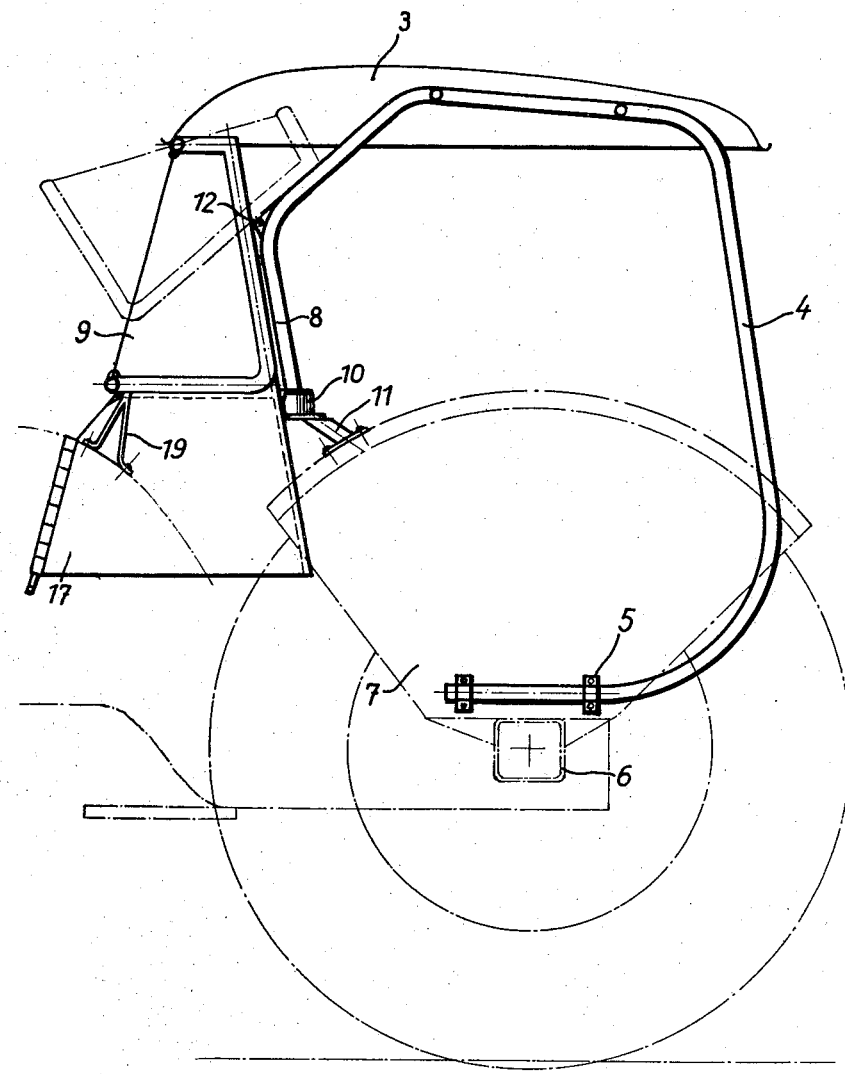
FIG. 1 is a side view illustrating one embodiment of a structure according to the present invention.
Figure 2:
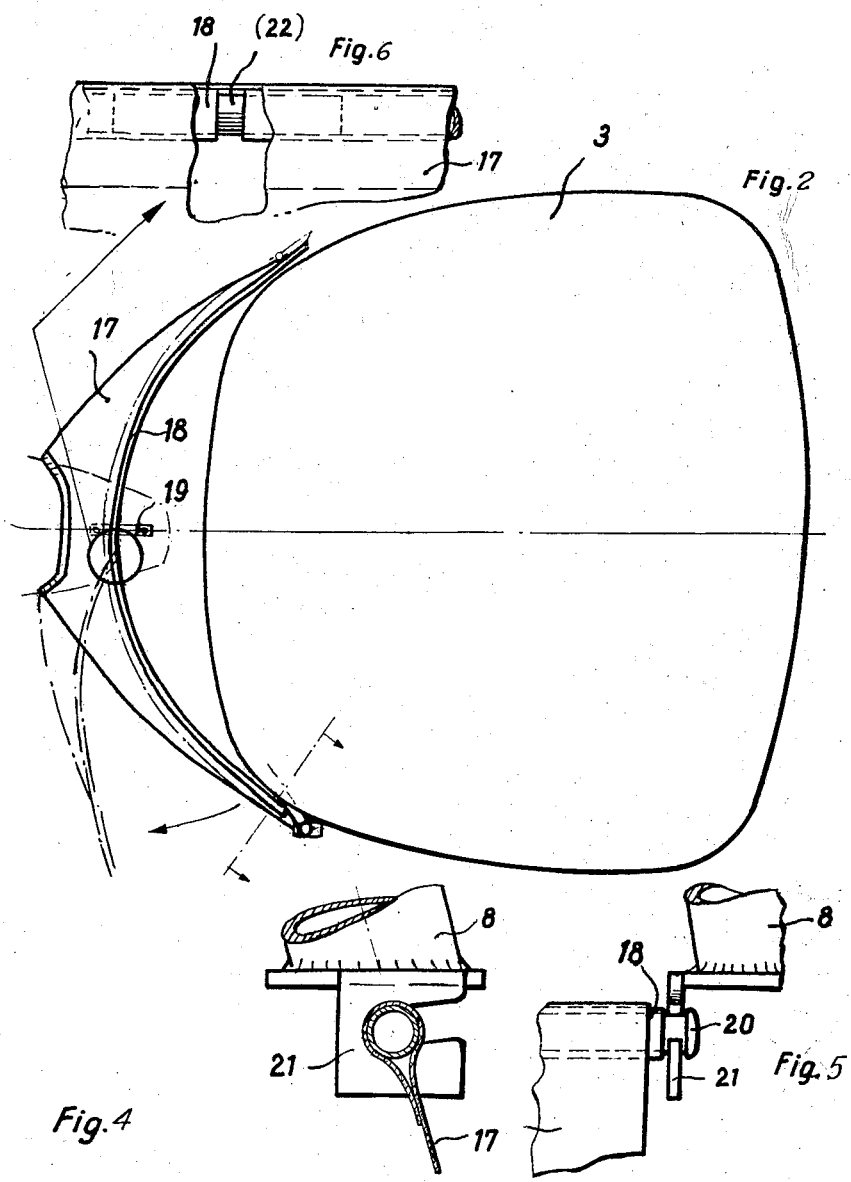
FIG. 2 is a plan view of the structure of FIG. 1.
Figure 3:
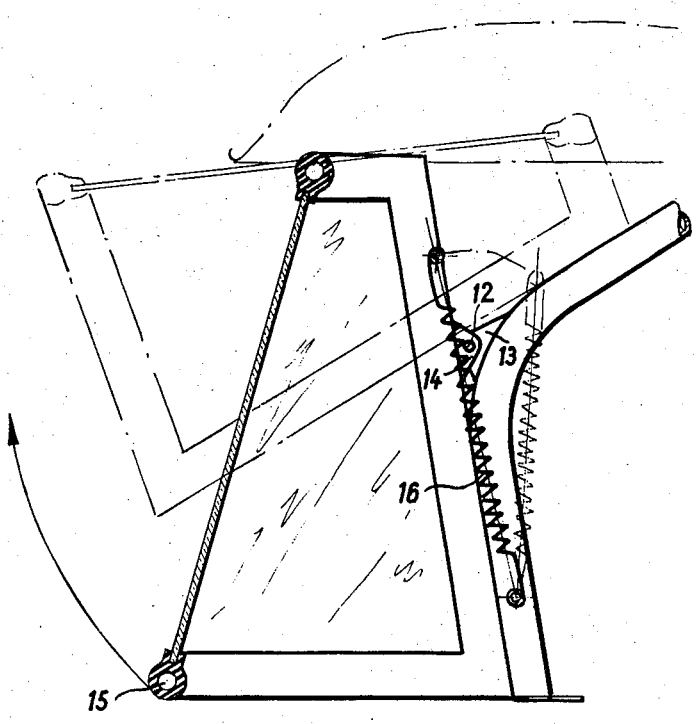
FIG. 3 is a side elevation illustrating the windshield arrangement of the invention.

In the embodiment of FIGS. 1 and 2 the roof member 3 can be in the form of a plastic sheet which is suitably dished so as to have a downwardly directed concave surface and an upwardly directed convex surface. The springy rod means of the embodiment of FIGS. 2 and 3 is formed by a pair of springy rods 4 which are respectively located at the opposite sides of the vehicle and carried by the fenders thereof, for example, which are located at the rear wheels. As is most clearly apparent from FIG. 1, each springy rod 4, which is in the form of an elongated hollow springy metallic tube, has a lower substantially horizontal portion extending from the extremity of this lower portion rearwardly to a curved portion which extends around up to the roof member 3, and at the roof member 3 the springy rod 4 at each side of the vehicle has an upper substantially horizontal portion which is fixed to the roof member 3 by any suitable rivets or the like, for example. From the upper horizontal portion thereof, each springy rod 4 has a front portion extending forwardly and downwardly from the upper horizontal portion, and the front portion 8 of the springy rod 4 carries a windshield 9, this windshield 9 extending between and connected pivotally with the front rod portions 8, in a manner described in greater detail below. As may be seen from FIG. 1, a pair of clips or clamps 5 serve to fix the lower horizontal portion of the rod 4 to the support means of the vehicle, this support means being formed in the illustrated example by the fender 7. Preferably the lower horizontal portion of the rod 4 is fixed to the stiffest part of the fender and it is located directly over the rear axle 6. If desired the lower portion of the rod 4 may be fixed directly with the axle assembly. The tubes 4 of FIGS. 1 and 2 may be made of steel, for example, and the tubes 4 have the desired springy characteristics so that they reliably oppose forces acting on the roof 3 irrespective of the direction of these forces.

In order to protect the pair of springy rods 4 from the necessity of absorbing relatively large peak loads, a pair of resilient means 10 is respectively connected to the bottom free ends of the forward rod portions 8, these resilient means 10 acting as shock absorbers, for example, so as to absorb the peak loads and in this way protect the rods 4. The pair of resilient means 10 may each be in the form of a coil spring, for example, fixedly carried by a bracket 11 which is in turn fixedly carried by the support means formed, for example, by the fender 7. The pair of resilient means 10 protect the forward rod portions 8 against lateral forces. In the rest position of the parts where the vehicle is not moving and is not subject to any vibrations the pair of resilient means 10 are practically without any load.

The windshield 9 is curved forwardly, as illustrated in FIGS. 1 and 2, and its length is relatively short. Such a relatively short windshield provides better viewing conditions to the sides of the vehicle than a relatively long windshield which extends substantially across the entire vehicle. The roof member 3, as is evident from FIG. 2, is relatively narrow at its front end so as to cooperate properly with the relatively short windshield 9, and roof member 3 widens considerably toward the rear and terminates in a relatively wide rear end, as evident from FIG. 2. The pair of springy rods 4 of course extend along the sides of the roof member 3 to which these rods 4 are connected, and of course the front rod portions 8 are spaced from each other by a distance corresponding to the distance between the side edges of the windshield 9. Because of the widening of the roof member 3 toward the rear it gives sufficient coverage for the space beneath the roof member even though the roof member and the windshield are relatively small at the front end of the roof member.

In order to enable the operator to enter into the vehicle from the front, the windshield 9 is capable of being turned upwardly. As may be seen from FIG. 3, at each side of the windshield the frame of the latter fixedly carries an ear 14 which overlaps and ear 13 fixed to the front rod portion 8, and a pivot pin 12 pivotally interconnects the ears 13 and 14. The pair of pivot pins 12 which are located at the opposite sides of the windshield have a common turning axis, and the windshield is in this way carried by the front rod portions 8 for turning movement about this substantially horizontal axis. The windshield 9 is turnable between the lower operating position thereof illustrated in solid lines in FIG. 3 and the upper inoperative position indicated in dot-dash lines in FIG. 3, and a spring means 16 is provided for yieldably and resiliently holding the windshield in each of these positions. The spring means 16 is in the form of a snap-over center spring means which will urge the windshield to one or the other of the illustrated positions thereof as soon as the spring means moves through its dead-center position. Thus, as may be seen from FIG. 3 the spring means is in the form of a coil spring 16 which may be located at each side of the windshield and connected at one end to the side of frame 15 which forms part of the windshield and at the opposite end to the front rod portion 8. The mounting of each spring 16 is such that when the windshield is in the solid line position indicated in FIG. 3 the spring 16 is located to the left of the pivot pin 12, as viewed in FIG. 3, while when the windshield is in the dot-dash line position indicated in FIG. 3, the spring 16 is located to the right of the pivot 12, so that during the turning of the windshield between its positions spring 16 will initially be stretched until it has a maximum length and thereafter automatically urge the windshield to one or the other of its positions, the spring 16 having its maximum length when it is in its dead-center position.

Referring now to FIGS. 1, 2 and 4, 6, it will be seen that a sheet 17 of a suitable fabric extends from the lower edge of the windshield 9 downwardly to the hood of the vehicle, this sheet 17 providing protection against the wind and rain. The sheet 17 is carried at its upper edge by tube 18 which is substantially coextensive with and located directly beneath the lower part of the windshield frame 15. A bracket 19 which is carried by the hood of the vehicle supports the tube 18 and fixes the latter to the vehicle. The ends of the tube 18 are each closed by a plug 20 (FIG. 5) having a press fit in the end of the tube 18, as illustrated in FIG. 5, and the plug 20 has an enlarged head end so that a substantially hook-shaped member 21 can cooperate with the plug in the manner illustrated in FIGS. 4 and 5. These hook-shaped members 21 are respectively fixed to the free ends of the forward rod portion 8, and with this arrangement the ends of the tube 18 are hooked at the plugs 20 thereof onto the hook members 21 so that the member 18 is maintained in a position where the protective sheet 17 extends across and covers a space beneath the windshield 9. The tube 18 is interrupted to one side of the bracket 19, and the construction at the interrupted part of the tube 18 is shown most clearly at FIG. 6. At its interruption the tube 18 carries a flexible elongated member 22 made of plastic, for example, this member 22 has a press fit within the adjoining tubular portions of the tube 18 or otherwise being fixed to the latter so that the member 22 forms a hinge which pivotally connects the portions of the tube 18 at the interruption of the latter. The elongated flexible member 22 may be clamped within the tube 18 so as to be fixed to the latter. Thus, with this construction it is possible to remove an end of the tube 18 from a hook 21 and turn this released end of the tube 18 together with the portion of the sheet 17 fixed thereto upwardly away from the support means formed by the hood so as to allow entry into the vehicle from the front thereof. Of course, with the structure described above, since the bracket 19 is fixed on the one hand to the hood of the vehicle and on the other hand to the tube 18, it is only the portion of the tube 18 located below the bracket 19, as viewed in FIG. 2, which can be turned from the solid to the dot-dash line indicated in FIG. 2 so that the entry necessarily takes place from the lower side of the vehicle, as viewed in FIG. 2, and of course in this event there is only one end of the tube 18 which is provided with a plug and cooperates with a hook member 21 so as to release the tube 18 for movement in the manner illustrated in FIG. 2. The forwardmost edge of the sheet 17 is fixed in any suitable way to the hood. For example this forwardmost edge may be connected to rubber straps or the like which are hooked onto the hood of the vehicle.

The above-described structure can be incorporated into any modern tractor without any difficulty. The points at which the structure of the invention are supported on the vehicle are so chosen that there need be no great variation in the location of the structure of the invention on conventional tractors.

A further embodiment of the invention is described below and shown in FIGS. 7–10. Referring to FIGS. 7–10, it will be seen that the upper horizontal portion 4a of each springy rod 4 is protected against excessive stressing by a strut 23. These struts 23 are arranged at the opposite sides of the vehicle to cooperate with both of the horizontal portions 4a. Each strut 23 extends substantially vertically from the fender 7 to which it is fixed and is in the form of a hollow tube of steel or the like. The struts 23 are preferably located over the rear axle assembly 6. At their upper ends the struts 23 are provided with a means which cooperates with the horizontal rod portions 4a to prevent the latter from having to withstand excessively large forces. Thus, at the top end of each strut 23 is fixed a sleeve 24 provided in its interior with a layer of resilient yieldable material such as an inner sleeve 25 made of soft rubber or the like. The tubular rod portion 4a extends with clearance through the rubber sleeve 25. Because of the play available to the upper horizontal portions 4a in the sleeves 25, the rods 4 can freely move during absorbing of vibrations without calling the struts 23 into operation. However, when excessively large loads are applied to the springy rod means 4, then the excessive vertical movement of the horizontal rod portions 4a will cause the latter to engage and compress the layer 25 of yieldable material and thus transfer the load to the strong struts 23 which otherwise do not participate in the support of the roof 3. For example, if the vehicle should accidentally turn over so that it rests on the roof 3, it is clear that the struts 23 will prevent collapse of the springy rods 4 and will maintain the roof 3 spaced from the remainder of the vehicle so that considerable safety is provided by these struts 23 in the case of emergency.

In order to permit the rod portions 4a to extend through the sleeves 24, 25, these rod portions 4a are made in two pieces with the left part of the rod portion 4a, as viewed in FIG. 8, having an extension 26 of smaller diameter extending into the hollow right part of the rod portion 4a, as viewed in FIG. 7, so that in this way the two rod parts are interconnected and at the same time it is possible to pass the rod portions 4a through the sleeves 24, 25. Of course, the rivets, screws, or the like used to fix the upper portions 4 to the roof 3 space these upper portions sufficiently from the outer surface of the roof 3 to provide the space necessary for the sleeves 24, 25 at the inner portions thereof which are necessarily located between the horizontal rod portions 4a and the exterior surface of the roof member 3.

A stop means is provided to prevent excessive loading of the resilient shock absorber means 10 which are carried by the pair of brackets 11, and this stop means includes for each of the resilient means 10 a plate portion 27 and a plate portion 29 fastened to the plate portion 27 by suitable screws 28, in the manner indicated in FIGS. 9 and 10, so that the member 29 can be separated from the member 27. These plates 27 and 29 form together a single unitary plate structure which is formed with an opening through which the front rod portion 8 extends with clearance. Thus, the stop means 27, 29 will not interfere with the normal movement of the front rod portion 8 during normal vibrations or other movements of the roof member 3. Also, yieldable movement vertically is not in any way influenced by the stop means 27, 29. The upper plate portion 27 forms part of a cap 30 which is formed with an elongated cutout 31 extending downwardly through the cap 30 from the top to the bottom thereof so as to form the opening of the upper plate portion 27 through which the front rod portion extends as well as to form the space which accomodates the resilient means 10 as well as the structure connected immediately to the latter. The bracket 11 at each side of the vehicle includes a pair of plate portions 32 and 33 which are fixed to the bracket 11 in the manner shown in FIG. 10 so that these plate portions 32 and 33 define between themselves a space of a given thickness. The bottom plate portion of the cap 30 corresponds to the top plate portion 27 thereof and is formed with an elongated U-shaped cutout of the same configuration as the cutout of the plate portion 27 through which the front rod portion 8 extends. Thus, with the member 29 removed from the cap 30, the latter can simply be slipped into the position shown in FIGS. 9 and 10 with the bottom wall of the cap 30 extending into the space between the plates 32 and 33 so that the screws 34 can then be threaded through the bottom plate 33 into suitable threaded openings of the bottom wall of the cap 30 for fixing the latter to the bracket 11 in this manner. Thereafter, the plate 29 is placed on the upper wall 27 of the cap 30 and fastened to the latter by the screws 28. This cap means acts effectively as a stop for limiting the horizontal forces acting on thet resilient means 10, the stop means 27, 29 preventing excessive deformation of the resilient means 10 by unusually large horizontal forces.

It will be understood that each of the elements described above, or two or more together, may also find a useful application in other types of vehicles differing from the types described above.

While the invention has been illustrated and described as embodied in roofs for vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letter Patent is:

1. In a vehicle, in combination, support means; a roof member spaced from and located over said support means; a pair of elongated springy rods respectively located at opposite sides of the vehicle, said rods having lower end portions respectively fixed to said support means, intermediate portions extending upwardly from said portions, and upper portions respectively fixed to said roof member for carrying the latter, said rods being free to viblate at all parts except said lower end portions thereof; a pair of struts fixed to support means and extending therefrom upwardly toward said upper portions of said rods, respectively, said struts having respectively upper end portions located adjacent said upper portions of said rods; and a pair of sleeves respectively fixed to said upper free end portions of said struts, each sleeve having a layer of resilient material located in its interior, and said upper portions of said rods respectively being surrounded by and extending with clearance through said layers of resilient material so that when excessively large forces act on said rods the upper portions of the latter will engage the layers of resilient material to transfer the forces through the sleeves to said struts.

2. In a vehicle, in combination, support means; a roof member spaced over said support means; a pair of elongated springy rods each having a lower end portion respectively fixed to said support means, having an intermediate portion extending from said lower portion up to said roof member, having an upper portion respectively fixed to said roof member for carrying the same, and having forward portion extending downwardly from said upper portion, said forward portion terminating respectively in a freely movable bottom end spaced from said support means, each of said rods being free to vibrate at all parts except said lower end portion thereof, and said rods and said support means being the only structural elements supporting said roof member; a pair of resilient means respectively fixed to said freely movable bottom end of said forward rod portion for absorbing unusually large loads but otherwise leaving said bottom end free to vibrate; and stop means cooperating with each of said resilient means for limiting the movement of the latter when subjected to unusually large horizontal forces, the pair of stop means respectively extending with play around the pair of resilient means.

3. In a vehicle, in combination, support means; a roof member spaced over said support means; a pair of elongated springy rods each respectively having a lower end portion fixed to said support means, an intermediate portion extending from said lower portion upwardly to said roof member, an upper portion respectively fixed to said roof member for carrying the latter, and a forward portion extending downwardly from said upper portion, said forward portion of said rod means respectively terminating in a free bottom end spaced from said support means, each of said rods being free to vibrate at all parts except said lower end portion thereof, and said rods and said support means being the only structural elements supporting said roof member; a pair of resilient means respectively connected with said freely movable bottom end of said forward portions for absorbing unusually large forces but otherwise leaving said bottom end free to vibrate; a pair of brackets respectively carrying said pair of resilient means and fixedly carried by said support means; and a pair of stop means also carried by said brackets, respectively, and cooperating with said pair of resilient means for limiting the movement of the latter when subjected to horizontal forces, said pair of stop means respectively having upper wall portions formed with cutouts through which said forward rod portions extend with clearance adjacent the bottom ends of said forward rod portions.

4. In a vehicle, in combination, support means; a roof member spaced over said support means; a pair of elongated springy rods respectively having lower end portions fixed to said support means, intermediate portions extending upwardly from said lower portions, upper portions fixed to said roof member for carrying the latter, and forward portions extending downwardly from said upper portions and respectively having ends spaced from said support means, said rods being free to vibrate at all parts except said lower end portions thereof; a windshield carried by said forward rod portions and extending between the same, said windshield having an outer frame which is pivotally connected to said forward rod portions, respectively, for supporting the windshield for turning movement with respect to said forward rod portions about a horizontal axis, said windshield being turnable about said axis between an operative position and an inoperative position; and snapover center spring means cooperating with said windshield for resiliently urging the latter to one or the other of said positions thereof after the spring means has moved through its dead-center position.

5. In a vehicle, in combination, support means; a roof member spaced over said support means; springy rod means fixed at only one end portion to said support means, extending upwardly therefrom, and carrying said roof member, said springy rod means being free to vibrate at all parts except said one end portion fixed to said support means, and said rod means yieldably and resiliently opposing forces acting on said roof member irrespective of the direction of said forces, said rod means including a pair of forward rod portions extending downwardly from said roof member and respectively having ends spaced from said support means; a windshield carried by said forward rod portions; a fabric sheet extending along the lower edge of said windshield and extending from the latter downwardly to said support means, said fabric sheet respectively having lateral portions turnable upwardly away from and back to said support means; and an elongated hollow tube extending along the lower edge of said windshield and carrying said sheet at the upper edge of the latter, said tube having free ends respectively connected removably to said support means.

6. In a vehicle, in combination, support means; a roof member spaced over said support means; springy rod means fixed at only one end portion to said support means, extending upwardly therefrom, and carrying said roof member, said springy rod means being free to vibrate at all parts except said one end portion fixed to said support means, and said rod means yieldably and resiliently opposing forces acting on said roof member irrespective of the direction of said forces, said rod means including a pair of forward rod portions extending downwardly from said roof member and respectively having ends spaced from said support means; a windshield carried by said forward rod portions; a fabric sheet extending along the lower edge of said windshield and extending from the latter downwardly to said support means, said fabric sheet respectively having lateral portions turnable upwardly away from and back to said support means; and an elongated hollow tube extending along the lower edge of said windshield and carrying said sheet at the upper edge of the latter, said tube having free ends respectively connected removably to said support means, said tube being interrupted at an intermediate portion thereof and a flexible connector element located at the intermediate portion of said tube at the interruption of the latter, and interconnecting the portions of the tube and said interruption for turning movement one with respect to the other.

References Cited in the file of this patent

UNITED STATES PATENTS

| | | |
|---|---|---|
| 639,890 | Delaney | Dec. 26, 1899 |
| 712,651 | Collier | Nov. 4, 1902 |
| 1,765,639 | Tucker | June 24, 1930 |
| 2,256,890 | Brown | Sept. 23, 1941 |
| 2,732,963 | Grubich | Jan. 31, 1956 |
| 2,785,002 | Schumaker | Mar. 12, 1957 |
| 2,795,458 | Weischel | June 11, 1957 |
| 2,921,799 | Hatten | Jan. 19, 1960 |

FOREIGN PATENTS

| | | |
|---|---|---|
| 467,962 | Great Britain | June 25, 1937 |